US010768796B2

(12) United States Patent
Kim et al.

(10) Patent No.: US 10,768,796 B2
(45) Date of Patent: Sep. 8, 2020

(54) METHOD OF DISPLAYING USER INTERFACE ON DEVICE, AND DEVICE

(71) Applicant: SAMSUNG ELECTRONICS CO., LTD., Suwon-si (KR)

(72) Inventors: Sin-ae Kim, Seoul (KR); Young-sun Kim, Suwon-si (KR); Jae-young Lee, Hwaseong-si (KR); Seung-eok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/456,412

(22) Filed: Jun. 28, 2019

(65) Prior Publication Data

US 2019/0324628 A1 Oct. 24, 2019

Related U.S. Application Data

(63) Continuation of application No. 14/169,276, filed on Jan. 31, 2014, now Pat. No. 10,387,006.

(30) Foreign Application Priority Data

Jan. 31, 2013 (KR) ........................ 10-2013-0011491
Jul. 18, 2013 (KR) ........................ 10-2013-0084929

(51) Int. Cl.
*G06F 3/00* (2006.01)
*G06F 3/0484* (2013.01)
*G06Q 10/10* (2012.01)

(52) U.S. Cl.
CPC ......... *G06F 3/04842* (2013.01); *G06Q 10/10* (2013.01)

(58) Field of Classification Search
CPC ........ G06F 8/61; G06F 3/0482; G06F 16/285; G06F 16/313; G06F 17/2765;
(Continued)

(56) References Cited

U.S. PATENT DOCUMENTS 5,303,388 A 4/1994 Kreitman
6,918,123 B1 7/2005 Shteyn
(Continued)

FOREIGN PATENT DOCUMENTS

CN 1890952 A 1/2007
CN 101479722 A 7/2009
(Continued)

OTHER PUBLICATIONS

Communication dated Apr. 13, 2018 issued by the State Intellectual Property Office of P.R. China in counterpart Chinese Patent Application No. 201410044914.8.
(Continued)

*Primary Examiner* — Di Xiao
(74) *Attorney, Agent, or Firm* — Sughrue Mion, PLLC

(57) ABSTRACT

A method of displaying a user interface (UI) on a screen of a device is provided. The method includes selecting, when an event occurs, a first object, which is related to the event, from among the one or more objects included in the UI, determining a second object for executing a second operation related to a first operation, the first operation being executed when the first object is selected by an input to the device, and changing the first object into the second object.

11 Claims, 15 Drawing Sheets

(58) Field of Classification Search
CPC .... G06F 16/258; G06F 16/9535; G06F 16/29; G06F 16/9537; G06F 9/451; G06F 16/148; G06F 16/211; G06F 16/2291; G06F 16/23; G06F 16/337; G06F 16/35; G06F 16/353; G06F 16/93; G06F 16/951; G06F 17/212; G06F 17/218; G06F 17/24; G06F 17/274; G06F 3/0488; G06F 3/04883; G06F 9/543; G06F 16/24578; G06F 16/2474; G06F 17/243; G06F 17/27; G06F 17/2705; G06F 17/28; G06F 3/04817; G06F 9/453; G06F 16/24565; G06F 16/487; G06F 17/2785; G06F 21/53; G06F 2221/2101; G06F 3/04842; G06F 8/65; G06F 12/0831; G06F 12/0868; G06F 12/0871; G06F 12/0888; G06F 16/2379; G06F 16/24; G06F 16/248; G06F 16/3322; G06F 16/334; G06F 16/43; G06F 16/433
See application file for complete search history.

(56) References Cited

U.S. PATENT DOCUMENTS

| | | | | |
|---|---|---|---|---|
| 7,310,534 | B2 | 12/2007 | Northcutt | |
| 8,510,731 | B2 | 8/2013 | Aiba et al. | |
| 8,738,469 | B2 | 5/2014 | Nagasaka et al. | |
| 8,843,853 | B1 | 9/2014 | Smoak | |
| 8,971,805 | B2 | 3/2015 | Kim et al. | |
| 9,032,315 | B2 | 5/2015 | Kim et al. | |
| 2003/0046304 | A1 | 3/2003 | Peskin | |
| 2003/0064736 | A1 | 4/2003 | Bickerton et al. | |
| 2007/0118818 | A1 | 5/2007 | Gunderson et al. | |
| 2008/0005679 | A1 | 1/2008 | Rimas-Ribikauskas et al. | |
| 2009/0225089 | A1 | 9/2009 | Schreyer et al. | |
| 2010/0095217 | A1 | 4/2010 | Kang | |
| 2010/0107150 | A1 | 4/2010 | Kamada et al. | |
| 2010/0113067 | A1* | 5/2010 | Fullam | H04W 4/021 455/456.3 |
| 2010/0159896 | A1 | 6/2010 | Shin et al. | |
| 2011/0034129 | A1 | 2/2011 | Kim et al. | |
| 2011/0035675 | A1 | 2/2011 | Kim et al. | |
| 2011/0072492 | A1 | 3/2011 | Mohler et al. | |
| 2011/0119355 | A1 | 5/2011 | Hwang | |
| 2011/0270936 | A1 | 11/2011 | Guthrie | |
| 2012/0084732 | A1 | 4/2012 | Filippov et al. | |
| 2012/0094719 | A1 | 4/2012 | Choi et al. | |
| 2012/0238248 | A1 | 9/2012 | Jonsson | |
| 2012/0260217 | A1 | 10/2012 | Celebisoy | |
| 2012/0306889 | A1 | 12/2012 | Wong et al. | |
| 2012/0316955 | A1* | 12/2012 | Panguluri | G06Q 30/02 705/14.41 |
| 2012/0324376 | A1 | 12/2012 | Hong | |
| 2013/0120266 | A1 | 5/2013 | Griffin | |
| 2013/0132896 | A1* | 5/2013 | Lee | G06F 16/907 715/808 |
| 2013/0205217 | A1* | 8/2013 | Schuller | G06F 3/01 715/739 |
| 2014/0040777 | A1 | 2/2014 | Jones | |

FOREIGN PATENT DOCUMENTS

| | | | |
|---|---|---|---|
| CN | 102474292 | A | 5/2012 |
| CN | 102474293 | A | 5/2012 |
| EP | 2254035 | A2 | 11/2010 |
| JP | 2003-177989 | A | 6/2003 |
| JP | 2004088479 | A | 3/2004 |
| JP | 2007514386 | A | 5/2007 |
| JP | 2010157207 | A | 7/2010 |
| JP | 201153923 | A | 3/2011 |
| KR | 10-2010-0071794 | A | 6/2010 |
| KR | 10-2011-0015106 | A | 2/2011 |
| KR | 1020110015105 | A | 2/2011 |
| KR | 1020110103309 | A | 9/2011 |
| WO | 2008002385 | A1 | 1/2008 |
| WO | 2008/114491 | A1 | 9/2008 |
| WO | 2011/102447 | A1 | 8/2011 |
| WO | 2013006654 | A2 | 1/2013 |

OTHER PUBLICATIONS

Communication dated Dec. 11, 2017, from the Japanese Patent Office in counterpart application No. 2014-015305.
Communication dated Jul. 4, 2018, issued by the European Patent Office in counterpart European Application No. 14153263.0.
Communication dated Sep. 13, 2017, from the State Intellectual Property Office of People's Republic of China in counterpart Application No. 201410044914.8.
Communication dated Sep. 19, 2018 issued by the State Intellectual Property Office of P.R. China in Counterpart Chinese Application No. 201410044914.8.
Communication, dated Jul. 4, 2014, issued by the European Patent Office in counterpart European Application No. 14153263.0.
International Search Report, dated May 16, 2014, issued by the International Searching Authority in counterpart International Application No. PCT/KR2014/000747.
Communication dated Jun. 17, 2019, issued by the Japanese Patent Office in counterpart Japanese Application No. 2018-145933.
Communication dated Feb. 25, 2020 from the Japanese Patent Office in application No. 2018-145933.
Communication dated Feb. 27, 2020 from the Korean Intellectual Property Office in application No. 10-2013-0084929.
Communication dated Jun. 1, 2020 by the Indian Patent Office in counterpart Application No. 350/CHE/2014.
Communication dated Jul. 6, 2020, from the European Patent Office in counterpart European Application No. 14153263.0.

* cited by examiner

FIG. 6

USER DEVICE (200)

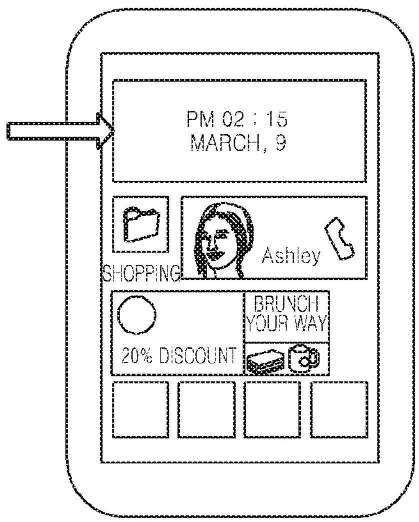

USER DEVICES DETERMINES WHETHER CURRENT TIME CONCURS WITH TIME CORRESPONDING TO SET SCHEDULE (S510)

USER DEVICE (200)

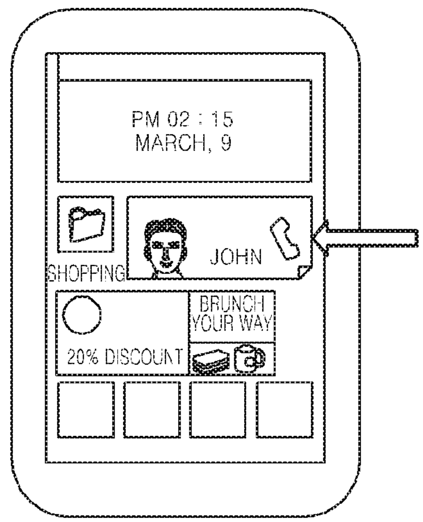

USER DEVICE MODIFIES COMPONENT DISPLAYING CONTACT INFORMATION SUCH THAT COMPONENT DISPLAYS CONTACT INFORMATION OF PARTICIPANTS RELATED TO SCHEDULE (520)

USER DEVICE (200)

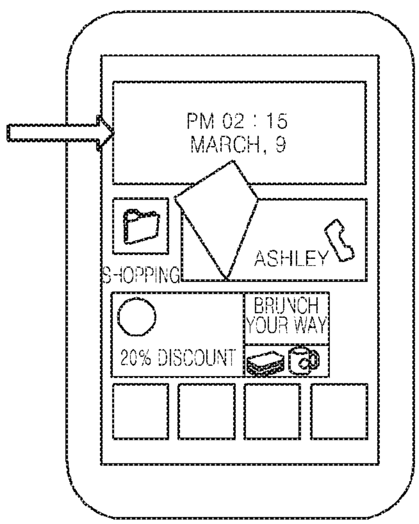

USER DEVICE RETURNS COMPONENT TO STATE BEFORE BEING MODIFIED (540)

USER DEVICE (200)

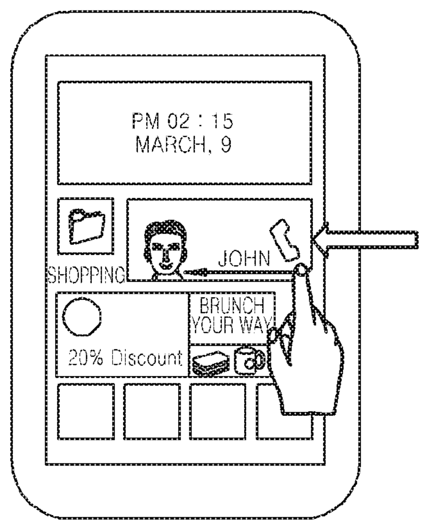

USER DEVICE RECEIVES USER INPUT WITH RESPECT TO MODIFIED COMPONENT (S530)

METHOD OF DISPLAYING USER INTERFACE ON DEVICE, AND DEVICE

RELATED APPLICATIONS

This application is a Continuation Application of U.S. application Ser. No. 14/169,276, filed on Jan. 31, 2014, which claims the benefit of Korean Patent Application No. 10-2013-0084929, filed on Jul. 18, 2013, and Korean Patent Application No. 10-2013-0011491, filed on Jan. 31, 2013, in the Korean Intellectual Property Office, the disclosures of which are incorporated herein in their entirety by reference.

BACKGROUND

1. Field

Methods and apparatuses consistent with one or more exemplary embodiments relate to a method of displaying information or a user interface (UI) by a device, and the device, and more particularly, to a method of displaying appropriate information or an appropriate UI on a user device and the user device.

2. Description of the Related Art

When using various appliances such as a mobile phone, a smartphone, a laptop computer, a tablet personal computer (PC), a handheld PC, an electronic book terminal, a digital broadcasting terminal, a personal digital assistant (PDA), a portable multimedia player (PMP), a navigation device, or a smart television (TV), a user may arrange a widget or an application execution icon on a background screen or a home screen.

However, according to the related art, a user background screen or a home screen of a user device is fixed regardless of information desired by a user, thus providing unwanted information or an unwanted UI to a user.

SUMMARY

One or more exemplary embodiments include a method of providing information or a user interface (UI) that is wanted by a user by appropriately modifying information or a UI that is provided to a user, and a user device on which the method is performed.

Additional aspects will be set forth in part in the description which follows and, in part, will be apparent from the description, or may be learned by practice of the presented exemplary embodiments.

According to one exemplary embodiment, a method of displaying a user interface (UI) on a screen of a device is provided. The method may include selecting, when an event occurs, a first object, which is related to the event, from among the one or more objects included in the UI, determining a second object for executing a second operation related to a first operation, the first operation being executed when the first object is selected by an input to the device; and changing the first object into the second object.

The event may be related to a schedule, and the first object and the second object may display information related to the schedule, and the first operation and the second operation may connect the user device to an external device based on connection information, according to the input.

The UI may be displayed on a home screen of the device, and each of the first object and the second object may be one from among a widget, an application execution icon, an application execution screen, and a combination thereof.

The determining of the second object may include: obtaining information related to the event; determining the second operation related to the first operation, based on the information related to the event; and determining the second object.

The first object may display information related to a first external device, and the first operation may request a phone-call with respect to the first external device according to an input, and the second object may display information related to a second external device, and the second operation may request to process a phone-call with respect to the second external device.

The information related to the first external device may include at least one from among a phone number of the first external device, an image that is set as the first external device, and identification information of the first external device, and the information related to the second external device may include at least one from among a phone number of the second external device, an image that is set as the second external device, and identification information of the second external device.

The information related to the event may include information about a schedule that is set to the device, and the second external device may be an external device that is related to the information about the schedule.

The event may correspond to a change in a geographical position of the device, and the information related to the event may include position information of the device.

The first object may be an icon for executing a first application, the second object may be an icon for executing a second application, and when the second application is not installed in the device, the method may further include downloading and installing the second application.

The selecting of the first object may include selecting the first object from among the one or more objects, based on at least one from among information about types of a plurality of pieces of content that are displayed via the one or more objects included in the UI, at least one from among information about categories of characteristics of the one or more objects, and at least one from among information about service providers of services that are provided via the one or more objects.

The first object may display a list of one or more applications, and the second object may display a list of recommended applications related to the one or more applications.

According to an exemplary embodiment, a device for displaying a UI is provided. The device may include a display unit configured to display the UI, the UI may include one or more objects, and a controller configured to select, when an event occurs, a first object that is related to the event, where the first object may be selected from among the one or more objects included in the UI, configured to determine a second object for executing a second operation related to a first operation, the first operating may be executed when the first object is selected by an input to the device, and configured to change the first object into the second object.

The event may be related to a schedule, the first object and the second object may display information related to the schedule, and the first operation and the second operation may connect the device to an external device based on connection information, according to the input.

The UI may be displayed on a home screen of the device, and each of the first object and the second object may be one from among a widget, an application execution icon, an application execution screen, and a combination thereof.

The controller may be configured to obtain information related to the event, configured to determine the second operation related to the first operation based on the information related to the event, and configured to determine the second object.

The first object may display information related to a first external device, and the first operation may request a phone-call with respect to the first external device according to the input, and the second object may display information related to a second external device, and the second operation may request to process a phone-call with respect to the second external device.

The information related to the first external device may include at least one from among a phone number of the first external device, an image that is set as the first external device, and identification information of the first external device, and the information related to the second external device may include at least one from among a phone number of the second external device, an image that is set as the second external device, and identification information of the second external device.

The information related to the event may include information about a schedule set to the device, and the second external device may be an external device that is related to the information about the schedule.

The event may correspond to a change in a geographical position of the device, and the information related to the event may include position information of the device.

The first object may be an icon for executing a first application, and the second object may be an icon for executing a second application, and when the second application is not installed in the device, the controller may be configured to download and install the second application.

The controller may be configured to select the first object from among the one or more objects, based on at least one from among information about types of a plurality of pieces of content that are displayed via the one or more objects included in the UI, at least one from among information about categories of characteristics of the one or more objects, and at least one from among information about service providers of services that are provided via the one or more objects.

According to an exemplary embodiment, there is provided a non-transitory computer-readable recording medium having recorded thereon a program for executing the method described, by a computer.

BRIEF DESCRIPTION OF THE DRAWINGS

These and/or other aspects will become apparent and more readily appreciated from the following description of the exemplary embodiments, taken in conjunction with the accompanying drawings in which:

FIG. 6 illustrates an example where a user device modifies a component and displays the same, according to an exemplary embodiment;

DETAILED DESCRIPTION

Figure 1:
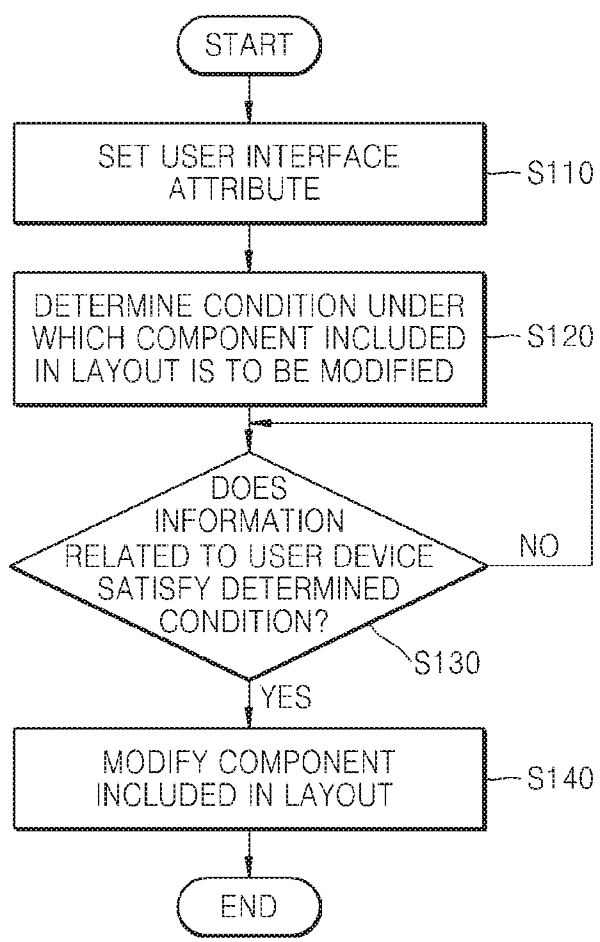
FIG. 1 is a flowchart of a process of displaying a user interface (UI) by using a user device, according to an exemplary embodiment.

Certain exemplary embodiments are described in greater detail below with reference to the accompanying drawings, in which exemplary embodiments of the present general inventive concept are shown. The inventive concept may, however, be embodied in many different forms and should not be construed as being limited to the exemplary embodiments set forth herein. In the description of the present general inventive concept, certain detailed explanations of the related art are omitted when it is deemed that they may unnecessarily obscure the essence of the inventive concept. Like numbers refer to like elements throughout the description of the figures.

It will be understood that, although the terms used in the present specification may be used herein to describe various elements, these elements should not be limited by these terms. These terms are only used to distinguish one element from another.

In the specification, when a region is “connected” to another region, the regions may not only be “directly connected”, but may also be “electrically connected” via another device therebetween. Also, when a region “includes” an element, the region may further include another element instead of excluding the other element, unless stated otherwise.

Also, when a part may “include” a certain constituent element, unless specified otherwise, it may not be construed to exclude another constituent element but may be construed to further include other constituent elements.

The terms used in the present specification are merely used to describe particular exemplary embodiments, and are not intended to limit the exemplary embodiments. The terms used in this specification are those general terms currently widely used in the art in consideration of functions in regard to exemplary embodiments, but the terms may vary according to the intention of those of ordinary skill in the art, precedents, or new technology in the art. Also, specified terms may be selected by the applicant, and in this case, the detailed meaning thereof will be described in the detailed description of the exemplary embodiments. Thus, the terms used in the specification should be understood not as simple names but based on the meaning of the terms and the overall description of the exemplary embodiments.

An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

An application as described in the specification refers to a series of computer programs designed to perform a particular task based on connection between devices, which will be described later. Examples of the application include a game application, an instrument playing application, a video replay application, a music replay application, a medical application, a payment application, a transportation (e.g., automobile, bus, air plane, or ship) automatic navigation application, a peripheral device control application, and combination of these applications.

Hereinafter, the term "unit" refers to a software component, or a hardware component such as FPGA or ASIC, and performs a certain function. However, the "unit" is not limited to software or hardware. The "unit" may be configured in an addressable storage medium and may be configured to be executed by one or more processors. Hence, the "unit" includes elements such as software elements, object-oriented software elements, class elements, and task elements, and processes, functions, attributes, procedures, subroutines, segments of program codes, drivers, firmware, micro-codes, circuits, data, databases, data structures, tables, arrays, and variables. The functions provided in the elements and the units may be combined into a fewer number of elements and units or may be divided into a larger number of elements and units.

FIG. 1 is a flowchart of a process of displaying a user interface (UI) by using a user device, according to an exemplary embodiment.

A user device refers to a device that is capable of displaying a UI. Examples of the user device include a mobile phone, a smartphone, a laptop computer, a tablet personal computer (PC), a handheld PC, an electronic book terminal, a digital broadcasting terminal, a personal digital assistant (PDA), a portable multimedia player (PMP), a navigation device, and a smart TV, but the user device is not limited thereto.

In the present specification, a UI includes at least one object, and refers to a device via which a user manipulates a user device, software, or combination of the device and the software. For example, a user device may output a UI including an icon for executing an application on a home screen via a touch screen included in the user device. As the user selects an icon displayed on the user device, the user device may execute a pre-set application. The at least one object included in the UI may be a component of the UI.

A home screen refers to a screen that is displayed on a display included in a user device 200 in order to manipulate the user device 200.

According to an exemplary embodiment, a window including at least one object or a set of objects displayed on a display included in a user device may be a UI.

In the present specification, an object included in a UI refers to an object output from a user device in order to execute a pre-set operation of the user device. For example, an object included in a UI may be implemented by a widget, an application execution icon, an application execution screen, or a combination of these, which are output on a screen of a user device.

A user device according to exemplary embodiments may set a UI attribute, and may display a UI according to the set UI attribute. The UI attribute may include a layout of a UI to be displayed to the user device. A layout of the UI may include information about sizes or arrangement of components that are included in the UI and are to be displayed on a display unit of the user device.

According to an exemplary embodiment, a UI attribute may further include a type of content to be displayed via a UI. The type of content to be displayed via a UI refers to a service gadget, a widget, an application execution icon, an application execution screen, or metadata of content, that is, information regarding which type of content is to be displayed via a UI, but is not limited thereto. For example the type of content may include information for distinguishing between, for example, a service gadget that displays advertisement information and an execution icon for an application via which city bus information is provided, or the like. However, the type of content is not limited thereto.

In addition, a UI attribute may include categories of services provided via a UI. For example, a UI attribute may include a schedule management service, a contact information display service, making a telephone call to displayed contact information, and displaying bus line information, that is, information regarding which service category is to be provided to a user via a UI. However, the UI attribute according to the current exemplary embodiment is not limited thereto.

In addition, a UI attribute may include information about a provider of a service that is provided via a UI. For example, when a user device displays an execution icon for a bus line providing application, via a UI, a UI attribute may include information about a provider of the bus line providing application.

According to an exemplary embodiment, a UI attribute may be set according to a default value stored in the user device or a user input with respect to the user device. However, the exemplary embodiments are not limited thereto. For example, if a component included in a set layout is a service gadget that displays contact information and makes a phone call to the displayed contact information when the component is selected, a 'service gadget that displays contact information and makes a phone call' may be a UI attribute regarding the component.

According to a method of displaying a UI by a user device according to an exemplary embodiment, first, a UI attribute to be displayed on a user device may be set in operation S110.

The UI attribute may be set according to each component included in a layout of a UI. For example, if two components are included in a layout, a UI attribute of one component may be a service gadget that displays contact information, and a UI attribute of the other component may be an icon for executing a shopping-related application.

A UI attribute of a component may be set according to an attribute of the component arranged in a layout. For example, if a widget that displays advertisement information is arranged in a layout, the widget displaying advertisement information may be set as a UI attribute of a component.

Then, the user device may determine a condition under which the component included in the set layout is to be modified, in operation S120.

According to an exemplary embodiment, a condition under which a component is to be modified may be determined based on characteristics of the component included in a layout. For example, if a component included in a layout is an icon for executing a bus line providing application, the user device may determine a condition for modifying an icon for executing a bus line providing application according to whether position information of the user device deviates from a range related to the characteristics of the component.

In addition, according to another exemplary embodiment, a user device may determine whether to modify a component based on information input via an application installed in the user device. For example, if information about a user's schedule is input via a schedule management application installed in a user device, whether a current time is included in a range from an input schedule time or not may be determined as a condition for modifying a widget that displays contact information.

In addition, according to another exemplary embodiment, a condition for modifying a component may be determined according to a user input. For example, a user device may determine a range with respect to position information based on a user input with respect to the user device. That is, whether the user device deviates from the range or not may be determined as a condition for modifying a component.

Then, if information related to the user device satisfies a determined condition in operation S130, the user device may modify the component included in the layout in operation S140.

Here, the user device may modify the component by considering the set UI attribute. For example, if a current time concurs with a time that is set via a schedule management application, the user device may search for contact information related to the set schedule. Then, the user device may change the component whose UI attribute included in the layout is displaying contact information to the component which displays the found contact information.

Alternatively, if a UI attribute of a component is set such that the component displays an icon for executing a shopping-related application, the user device may modify the component such that the component displays other information about the shopping-related application.

Also, according to an exemplary embodiment, a user device may determine information to be displayed via a component, by considering the information related to the user device, that satisfies a condition, in addition to a UI attribute. A user device may modify a component such that the component displays the determined information.

The information to be displayed may be information that satisfies a condition and recommended application information determined based on a UI attribute. For example, if information related to a user device is position information corresponding to the U.S.A. which is modified from position information corresponding to Korea, and a UI attribute is an icon for executing a Korean dictionary application, a user device may display information for recommending a Korean-English dictionary application.

A user device may install a recommended application according to a user input regarding the displayed recommended application information (not shown). For example, when a user device displays an execution icon for a recommended application, and the execution icon is dragged to the left via a touch screen of the user device, the recommended application may be installed to replace a previously displayed application. On the contrary, if the execution icon is dragged to the right, a component may be returned to a state before displaying the recommended application information. However, the exemplary embodiments are not limited thereto.

According to an exemplary embodiment, information related to a user device may be position information of the user device. In this case, a condition under which a component is to be modified may be whether the position information of the user device deviates outside a range.

Also, according to another exemplary embodiment, information related to a user device may be a text input to the user device or a text received from an external device. In this case, a condition under which a component is to be modified may be whether the text input to the user device or the text received from an external device includes significant keywords.

For example, if a user device has received a test saying "I want to eat chicken," from among texts received from an external social network service (SNS) server, advertisement information corresponding to a keyword 'chicken' may be displayed via a component that has a UI attribute for displaying advertisement information.

According to an exemplary embodiment, a component included in a layout may display a list regarding at least one application. For example, a folder icon for displaying a plurality of application execution icons may be included in a layout. Here, a user device may display a recommended application based on a type of an application included in the list and information related to the user device in operation S140. For example, if a component including a plurality of execution icons for shopping-related applications is included in a layout, the user device may display recommended application information about applications provided by department stores that are located within a distance with respect to the position information of the user device.

Figure 2:
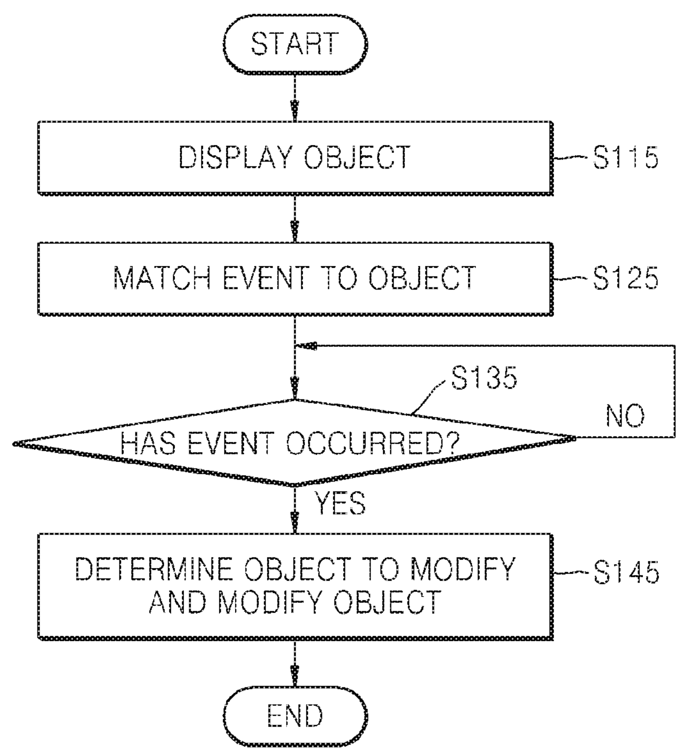
FIG. 2 is a flowchart of a process of displaying a UI by using a user device, according to an exemplary embodiment.

FIG. 2 is a flowchart of a process of displaying a UI by a user device 200, according to an exemplary embodiment.

The user device 200 may display at least one object included in a UI, on a screen, in operation S115. The UI is output on the user device so that a user may manipulate the user device 200 and information may be transmitted from the user device 200 to the user. For example, a background screen of a window or a screen output on a mobile phone may be a UI. However, the exemplary embodiments are not limited thereto.

An object included in a UI is a component for constituting a UI. For example, a service gadget, a widget, an application execution icon, a folder icon, an application execution screen, or metadata of content included in a layout may be an object that forms a UI.

Then, in operation S125, the user device 200 may match an event of a user device to a displayed object. However, this operation may not be necessarily included in the exemplary embodiment but may be omitted. The user device 200 may perform operation S135 without matching an event to an object.

In an exemplary embodiment, an event refers to an occurrence of an operation or an event that may be sensed by the user device 200. According to an exemplary embodiment, the event may be related to context information with respect to a situation of a user that the user device 200 may sense or obtain. According to an exemplary embodiment, an event related to a situation of a user may be related to a user's schedule that is set by using a personal information management system (PIMS). For example, an event related to a user's situation may be, if a user's schedule is set in the user device 200, that a current time corresponds to a time set in the user device 200. The current time does not have to necessarily correspond to the time set to the user device 200. If the current time is within a range from the set time of the user device 200, the user device 200 may be determined as corresponding to a corresponding time. According to the current exemplary embodiment, the user device 200 may match an event whose current time corresponds to a user's schedule, to an object displaying a user's schedule or to an object displaying contact information, from among objects included in a UI. However, the exemplary embodiments are not limited thereto. An event related to a user's situation may be related to information that may be obtained by using a sensor included in the user device 200, such as position information of the user device 200.

In the above-described exemplary embodiment, a user's schedule does not necessarily have to be directly set in the user device 200 but schedule information may also be obtained as the user device 200 logs on to a personal information management service provided via an additional server.

Alternatively, modification of geographic position information of a user device may be an event related to a user's situation. For example, if a user who was in Korea moves to Germany, the user device 200 may recognize that position information of the user device 200 has changed from Korea to Germany. For example, if Global Positioning System (GPS) coordinates which the user device 200 receives by using a GPS receiver are changed from coordinates in Korean territory to coordinates in German territory, the user device 200 may recognize that a position of a user has changed from Korea to Germany. According to an exemplary embodiment, the user device 200 may match an object related to position information of a user, such as an execution icon of a dictionary application or an execution icon of a bus line application, to position information of a user.

According to an exemplary embodiment, a user device may match an event to an object based on at least one from among a type of content displayed via the object, a category regarding a property of an object, to which the object belongs, and provider information of a service provided via the object.

Examples of the type of content may include an application execution icon, a widget, and an application execution screen. Examples of the category regarding a property of an object, to which the object belongs, may include an object related to position-related information, an object related to a schedule, and an object related to contact information. Alternatively, the user device 200 may match objects whose service provider information is identical, to a single event.

Then, the user device 200 may select a first object related to an event, from among at least one object included in a UI in operation S145, as an event occurs in operation S135. If there is an object that matches an event in operation S125 from among the at least one object included in a UI, the user device 200 may select the object that matches to the event. If operation S125 is not included according to an exemplary embodiment, the user device 200 may select a first object according to at least one object included in a UI and an attribute of an event.

The user device 200 may determine a second object for executing a second operation related to a first operation that is executed as the first object is selected by a user input with respect to the user device 200, and may modify the selected first object to the second object in operation S145.

For example, if a current time is a time included in a user's schedule set in the user device 200, the user device 200 may select a widget for making a phone call to a first external device. Here, the user device 200 may modify a widget for making a phone call to the first external device to a widget for making a phone call to a second external device that is related to the user's schedule. That is, if a schedule of a meeting with A is set in the user device 200, the user device 200 may modify a widget for making a phone call at a time at which the schedule is set, to a widget for making a phone call to a mobile phone owned by A. Thus, a user may easily make a phone call to the mobile phone owned by A by selecting the modified widget. According to an exemplary embodiment, the user device 200 may obtain a phone number of the mobile phone owned by A via an application for managing phone numbers, installed in the user device 200.

Alternatively, if a user who was in Korea moves to Germany, the user device 200 may recognize that position information of the user device 200 has changed from Korea to Germany. If an icon for executing an application related to bus line information of Korea is included in a UI, the user device 200 may modify the icon included in the UI to an icon for executing an application for providing German bus line information.

If no application for providing German bus line information is installed in the user device 200, the user device 200 may download and install an application for providing German bus line information. That is, according to the method of providing a UI according to the current exemplary embodiment, a first object is an icon for executing a first application, and a second object is an icon for executing a second application, and if the second application is not installed in the user device 200, the user device 200 may further include an operation of downloading and installing the second application.

According to an exemplary embodiment, the user device 200 may obtain information related to an event, in operation S145, and may determine a second operation related to the first operation that is executed by using the first object based on the information related to an event.

In an exemplary embodiment, information related to an event refers to information that the user device 200 may obtain in relation to an occurring event. For example, if a current time corresponds to a schedule set in the user device 200, the information related to an event may be contact information related to the set schedule, a name of a person related to the set schedule, a picture of a person related to the set schedule, connection information regarding an external device related to the set schedule, or a time at which the schedule is set. The connection information regarding an external device may include a phone number for connecting to an external device, identification information about an external device, an internet protocol (IP) address of an external device, a media access control (MAC) address of an external device, and a user ID of an external device. For example, if a schedule of "a meeting with John on January 1" is set, the user device 200 may obtain a phone number for making a phone call to John's phone via a phone book application installed in the user device 200.

According to an exemplary embodiment, the information related to an event may include information about a user's schedule, and the first object selected in operation S145 may be an object that displays information related to the user's schedule.

For example, if a schedule of a user is set in the user device 200, and the schedule is included within an hour from a schedule set at a current time, the user device 200 may select an object that displays information related to the schedule corresponding to the current time or may select an object displaying contact information as an event that matches an event related to the current time. The user device 200 may modify the selected object for displaying contact information such that the object displays contact information related to schedule information. In addition, if the modified object is selected according to a user input, the user device 200 may perform an operation of connecting to an external device corresponding to the contact information. The operation of connecting to an external device may include not only an operation of connecting to an external device for direct communication with the external device but also an operation of making a phone call, an operation of transmitting a text message via a communication network, and an operation of transmitting a message via a server, but is not limited thereto.

According to the above example, the user device 200 may obtain information related to a schedule by using an application installed in the user device 200, and may modify a display of an object such that information related to a schedule is displayed. For example, the user device 200 may obtain schedule information by using an application installed in the user device 200, and may obtain a phone number related to a name of a person included in schedule information, by using a phone number management application installed in the user device 200.

According to an exemplary embodiment, a first object may display information related to a first external device, and a first operation that is performed as the first object is selected may be an operation of requesting a phone call to the first external device according to a user input of a user that selects the first object. In addition, a second object may display information related to a second external device, and a second operation that is executed as the second object is selected may be an operation of requesting a phone call to the second external device according to a user input of a user that selects the second object. Here, according to an exemplary embodiment, information related to an external device may include at least one from among a phone number of an external device, an image set with respect to an external device, and identification information of an external device. That is, the first object may display, for example, a phone number for making a phone call to the first external device, a picture of an owner of the first external device, or a name of an owner of the first external device. Identification information about an external device may refer to a name of an owner of the first external device or a hardware ID. However, exemplary embodiments are not limited thereto. Likewise, the second object may display a phone number for making a phone call to the second external device, a picture of an owner of the second external device, or a name of an owner of the second external device.

According to an exemplary embodiment, if a selected object is an execution icon of a first application, the user device 200 may modify a display of the selected object to an execution icon of a second application determined based on information that is obtained as an event occurs.

For example, if position information of the user device 200 is modified, the user device 200 may select an execution icon of an application related to position information of an object that matches an event whose position information is modified. The user device 200 may modify a display of a selected object based on the modified position information. That is, if position information is modified from Korea to Germany, the user device 200 may modify an execution icon of a Korean dictionary application to an execution icon of a German dictionary application.

In addition, according to another exemplary embodiment, when the user device 200 modifies an execution icon of an application, and an application corresponding to an execution icon of an application that is to be modified and displayed is not installed in the user device 200, a second application may be downloaded via an application manager server so as to be installed.

According to another exemplary embodiment, the user device 200 may modify a screen list of applications according to an event. For example, a schedule may be set at a time with respect to the user device 200. If the set schedule is related to a name that is stored via a phone book application, the user device 200 may modify a UI via an order of phone number lists or phone numbers of the phone book application which are displayed.

According to another exemplary embodiment, the first object selected in operation S145 may display a list of at least one application. In addition, the second object may display a recommended application list related to the at least one application. For example, if an application execution icon displayed on a screen according to a user input is selected, the user device 200 may display a screen where an application related to the application execution icon is recommended.

Figure 3:
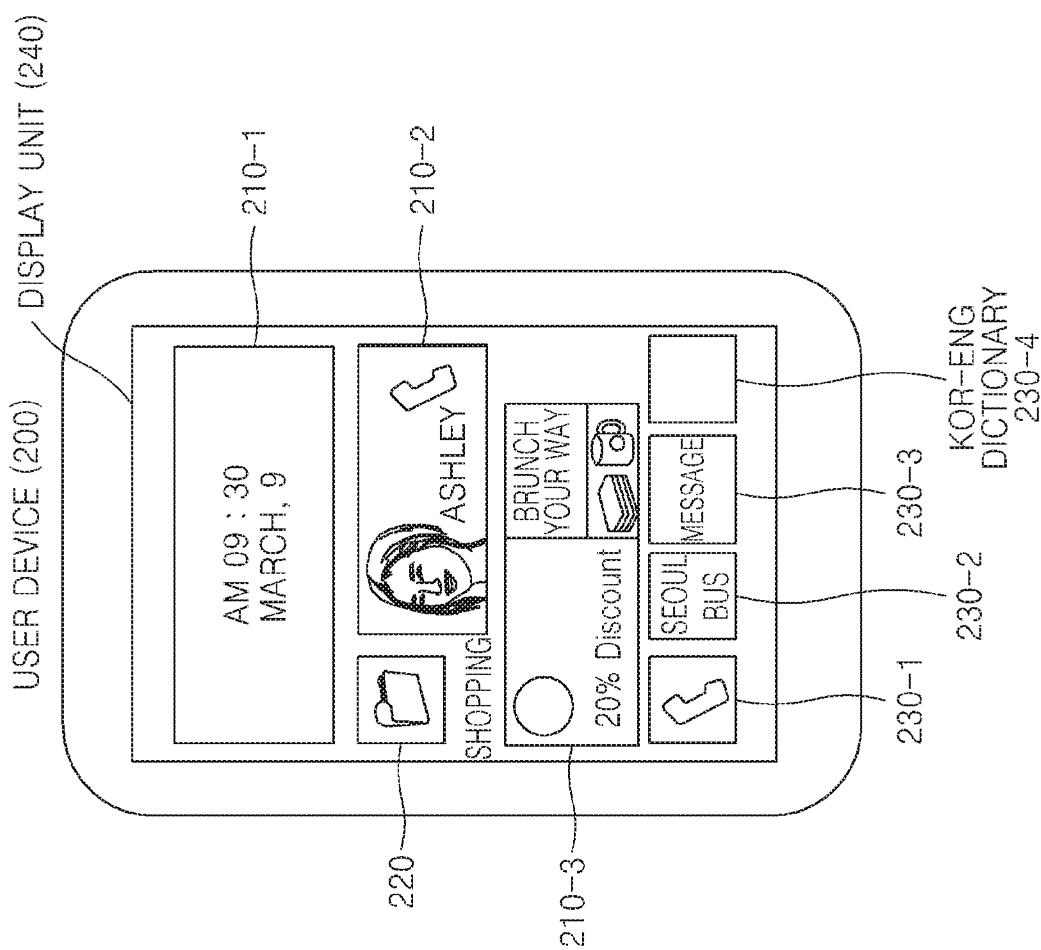
FIG. 3 illustrates an example of displaying a UI according to a layout set in a display unit of a user device, according to an exemplary embodiment.

FIG. 3 illustrates an example of displaying a UI according to a layout via a display unit 240 of a user device 200, according to an exemplary embodiment.

The user device 200 may display at least one component included in a layout, on the display unit 240 according to a set layout.

A component refers to at least one object that is displayable on the display unit 240 and that is included in a layout. Examples of the component include a service gadget, a widget, an application execution icon, a folder icon, an application execution screen, and metadata of content, included in a layout.

The component may be implemented in various forms such as service gadgets 210-1 through 210-3 for providing a service, a folder icon 220 including a plurality of objects, and application execution icons 230-1 through 230-4. However, the exemplary embodiments are not limited to the forms of the component illustrated in FIG. 3 and may be implemented in various forms such as a widget.

A service gadget may refer to an object that is implemented via an application program that has a small size sufficient to be hosted on a background screen or a webpage for the purpose of providing a service on a graphical user interface (GUI). A service gadget may be provided by a device or may be received from an external server.

A widget refers to an object generated by using an application program so that functions such as weather, a calendar, or a calculator and information such as news, games, or stock information may be immediately used in a device. According to an exemplary embodiment, a widget may provide functions or information without using a web browser.

According to an exemplary embodiment, the user device 200 may transmit a UI attribute to a server. Then, the user device 200 may receive a component generated by the server based on the UI attribute, and may display the received component according to a set layout.

Figure 4:
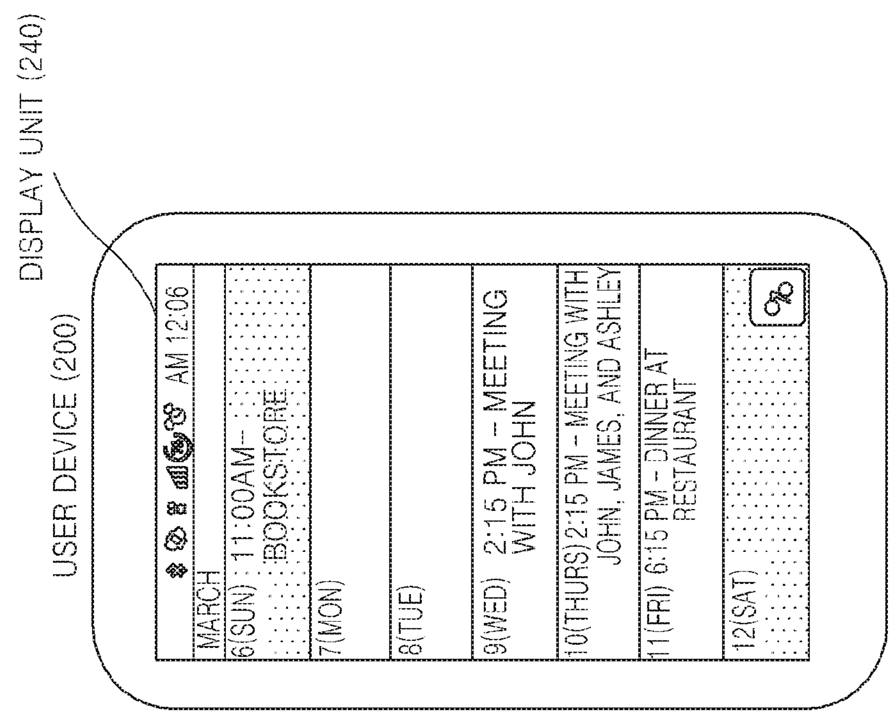
FIG. 4 illustrates an example of displaying information that is input via an application installed in a user device, performed by the user device, according to an exemplary embodiment.

FIG. 4 illustrates an example of displaying information that is input via an application installed in a user device 200, performed by the user device 200, according to an exemplary embodiment.

The user device 200 may select a condition under which a component is to be modified, based on information input via an application installed in the user device 200.

FIG. 4 illustrates an example of displaying a schedule that is input via a schedule manager application installed in the user device 200, displayed via the display unit 240, according to an exemplary embodiment.

According to an exemplary embodiment, the user device 200 may set a schedule of a user. However, the exemplary embodiments are not limited thereto, and the user device 200 may input information via a webpage, and may use input information using various methods such as receiving information about a schedule from a server.

According to another exemplary embodiment, the user device 200 may not only set information that is directly input via a schedule manager application, by a user, but also a schedule by using information that is input via another service. For example, if the user device 200 has received a text message saying, "see you at the intersection tomorrow at 6 pm," the user device 200 may perform a natural language analysis regarding the received text message, and may set a schedule based on information about time and location obtained through the natural language interpretation.

Figure 5:
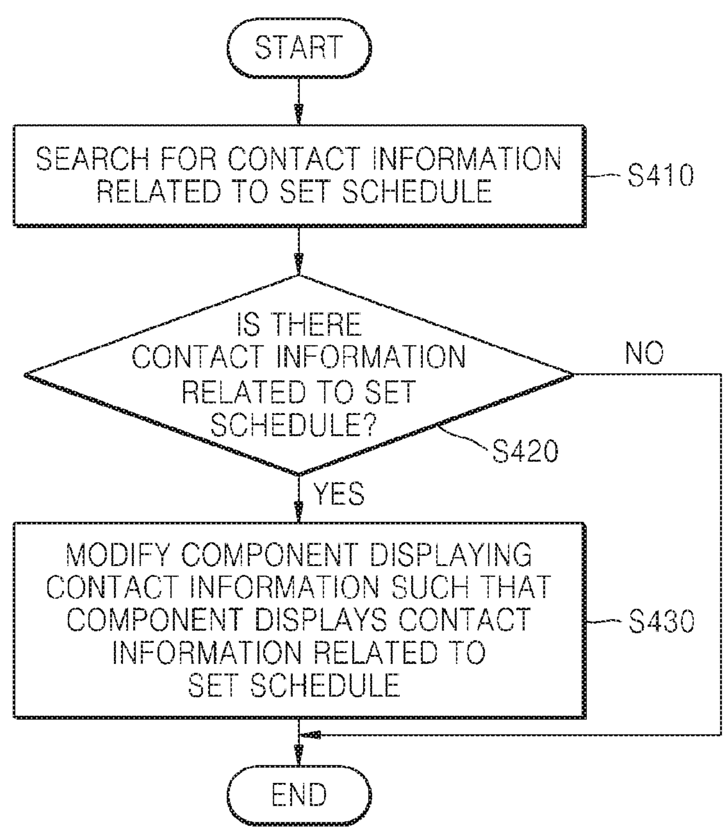
FIG. 5 illustrates a process of modifying a component included in a UI layout, performed by a user device, based on a time set via a schedule management application, according to an exemplary embodiment.

FIG. 5 illustrates a process of modifying a component included in a UI layout, performed by a user device 200, based on a time set via a schedule management application, according to an exemplary embodiment.

First, if a current time satisfies a condition that is determined as a schedule of a user is input in operation S120 and as illustrated in FIG. 4, the user device 200 may search for contact information related to the set schedule in operation S410.

Here, the condition determined as a schedule of a user is input may be varied according to exemplary embodiments. For example, the condition may match a set time or may be included within a predetermined range from a set time.

Then, if there is contact information related to the set schedule in operation S420, the user device 200 may modify a component such that the component displaying contact information displays contact information related to the set schedule.

Here, according to an exemplary embodiment, the user device 200 may modify not only a component that displays contact information in operation S430 but also a component having an attribute related to the set schedule. Also, the user device 200 may modify a component according not only to a current time but also context information with respect to a user. For example, if a schedule related to a restaurant at 7 pm is set, and a current time is 5 pm, and position information of the user device 200 is not at the restaurant, the user device 200 may display bus line information indicating how to go from a current position of the user device 200 to the restaurant via a widget that displays bus information.

Context information may refer to information related to a user's situation such as position information of the user device 200 or information obtained by using a sensor included in the user device 200. A sensor included in the user device 200 may be various sensors, for example, an acceleration sensor, a gravity sensor, a temperature sensor, or a motion sensor.

Alternatively, if position information of the user device 200 corresponds to the restaurant at 7 pm, and A, B, and C are set as participants for the set schedule, and it is determined that A and B are at the restaurant, the user device 200 may display contact information of C on a widget that displays contact information. Here, whether A and B are at the restaurant may be determined via an SNS server which the user device 200, a device A, and a device B are logged on to. That is, information indicating that positions of the device A and the device B are at the restaurant may be transmitted via an SNS server, and information notifying that the positions of the device A and the device B are at the restaurant may be transmitted to the user device 200 via the SNS server.

According to another exemplary embodiment, the user device 200 may display a component including a widget that displays contact information. Then, if there is schedule information within a period of time, the user device 200 may determine whether information about participants is included in schedule information. If information about participants is included in the schedule information, the user device 200 may modify a component that displays contact information such that the component displays contact information of the participants included in the schedule information. If information about participants is included in schedule information, the user device 200 may determine whether place information is included in schedule information. If place information is included in the schedule information, the user device 200 may modify a component that displays contact information such that the component displays an interface for making a phone call to a place included in schedule information.

In addition, according to another exemplary embodiment, the user device 200 may determine reliability of context information. The user device 200 may modify a component according to context information as long as a reliability of the context information is equal to or greater than a predetermined value.

FIG. 6 illustrates an example where a user device 200 modifies a component and displays the same, according to an exemplary embodiment.

As illustrated in FIG. 4, a schedule for March 9, at 2:15 pm may be input in the user device 200. The user device 200 may determine whether a current time concurs with a time corresponding to the schedule set at the current time in operation S510.

According to an exemplary embodiment, the user device 200 may recognize information input to the user device 200, as information about a time corresponding to a schedule set through natural language analysis and information about participants, but the exemplary embodiments are not limited thereto.

If a current time concurs with a time corresponding to a set schedule, the user device 200 may modify a component 210-2 displaying contact information to an object for displaying contact information of participants related to the schedule and for making a phone call to the displayed contact information in operation S520.

Then, if the component 210-2 that displays contact information is selected according to a user input, the user device 200 may make a phone call to the modified contact information.

According to an exemplary embodiment, the user device may display a UI for distinguishing a modified component, in operation S520. For example, a graphical effect such that a corner of paper is folded may be applied to an area of the component modified in operation S520. Alternatively, a UI for distinguishing the modified component may be displayed by modifying a font or a color of the user device 200.

Next, in operation S530, the user device 200 may receive a user input as feedback regarding the modified component. For example, if the user device 200 displays a UI via a touch screen, an input corresponding to an operation of swiping the touch screen in a direction from an area of the modified component, performed by a user, may be received.

Next, in operation S540, the user device 200 may return the modified component to a state before it is modified, according to a user input with respect to the modified component.

According to an exemplary embodiment, as the user device 200 performs an operation of displaying a previous component before being modified, the modified component may be peeled off, so the user device 200 may provide a user with a user experience that is as if the user tears off the modified component. Operation S540 may be implemented in various manners according to exemplary embodiments.

Figure 7:
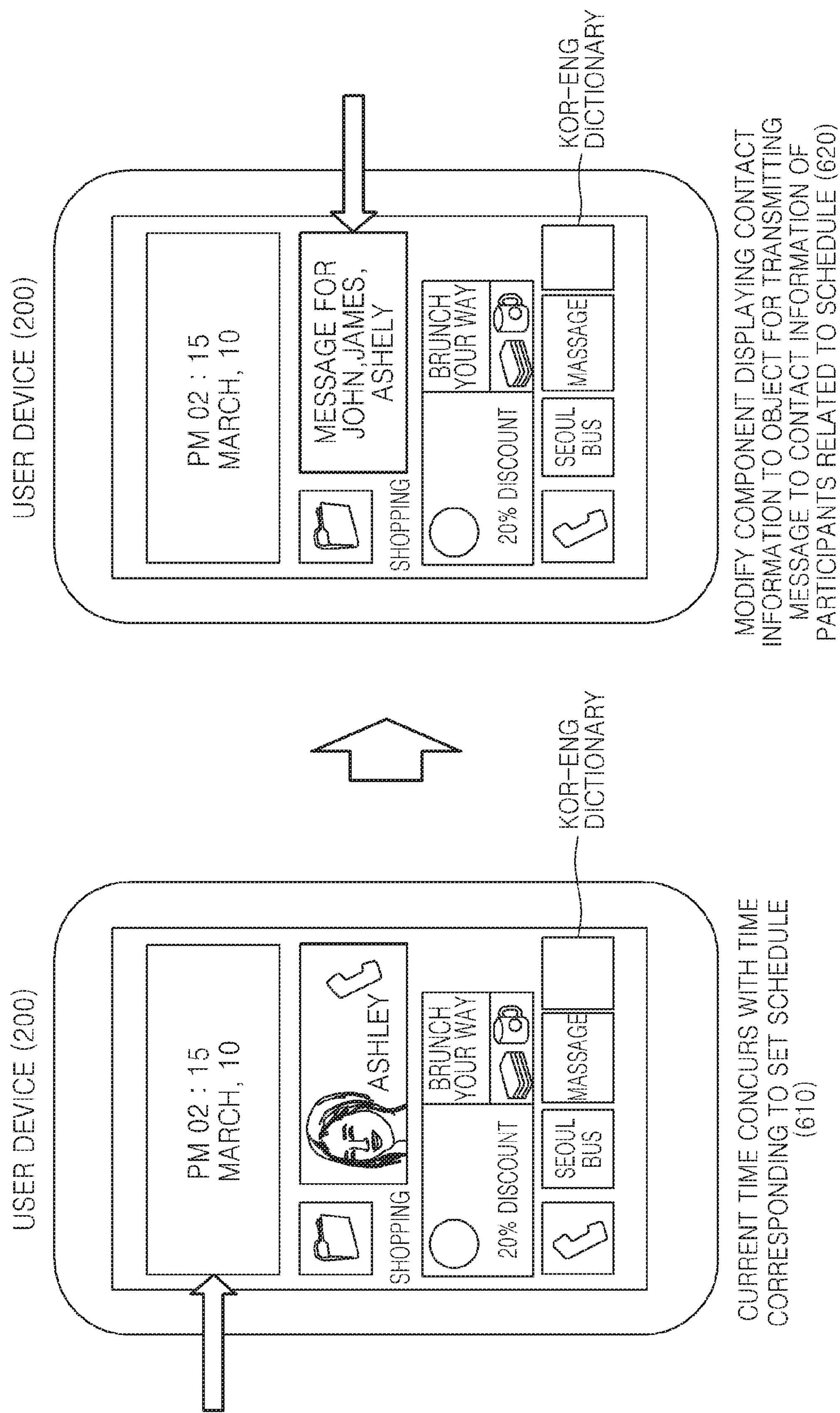
FIG. 7 illustrates an example where a user device modifies a component and displays the same, according to another exemplary embodiment.

FIG. 7 illustrates an exemplary embodiment where a user device 200 modifies a component and displays the same, according to another exemplary embodiment.

As illustrated in FIG. 4, a schedule for March 10 at 2:15 pm, related to multiple participants may be input to the user device 200. In operation S610, the user device 200 may determine whether a current time concurs with a time corresponding to the set schedule.

If the current time concurs with the time corresponding to the set schedule, the user device 200 may modify the component 210-2 displaying contact information to an object for displaying multiple participants related to the schedule and transmitting a message to contact information of the participants in operation S620.

The contact information of the participants may be found from contact information stored in an application stored in the user device 200 or an external server.

Next, if the component 210-2 for displaying contact information according to a user input is selected, the user device 200 may display a UI for transmitting a message to multiple participants.

Figure 8:
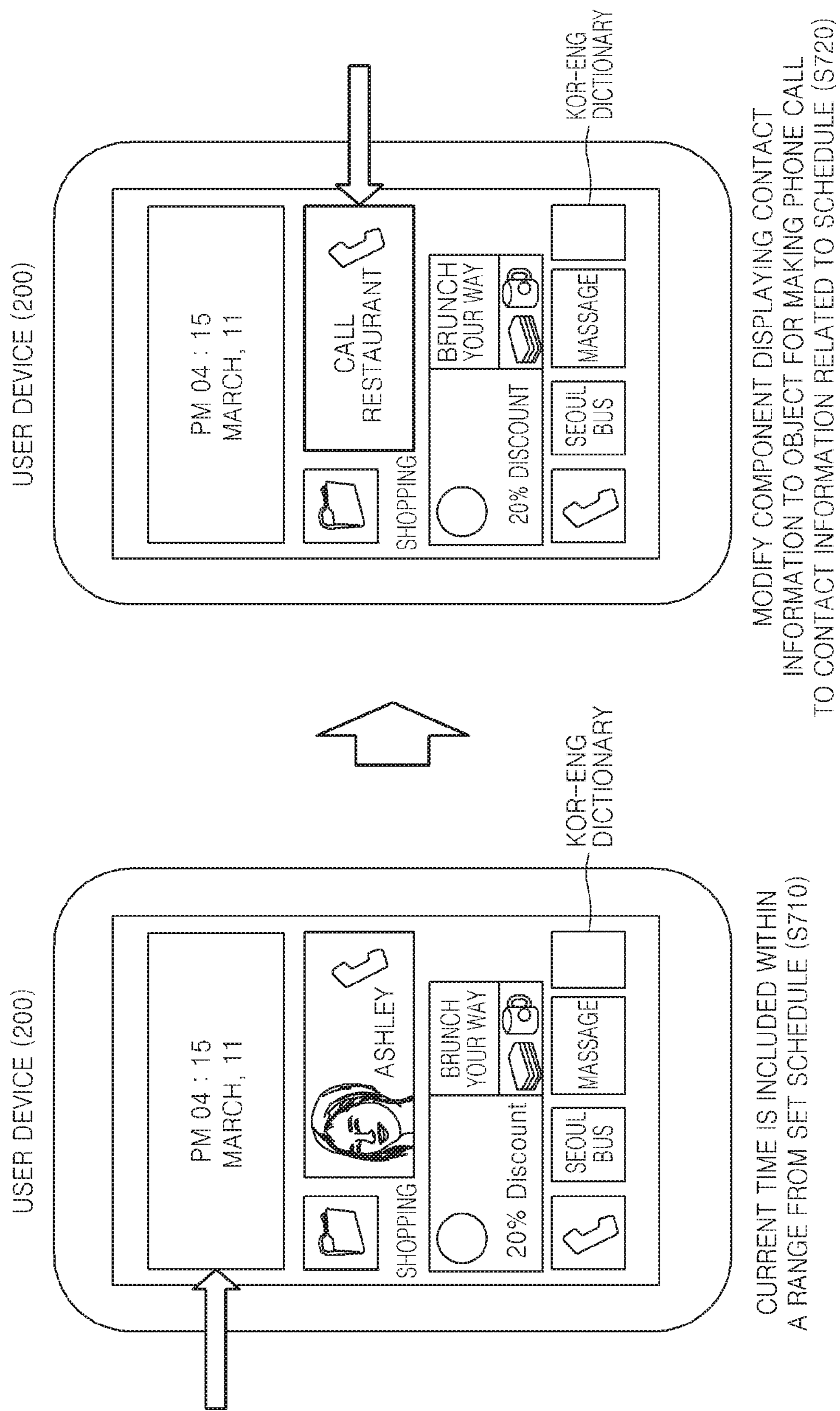
FIG. 8 illustrates an example where a user device modifies a component and displays the same, according to another exemplary embodiment.

FIG. 8 illustrates an exemplary embodiment where a user device 200 modifies a component and displays the same, according to another exemplary embodiment.

As illustrated in FIG. 4, a schedule for March 11 at 6:15 pm, related to a place may be input to the user device 200. In operation S710, the user device 200 may determine whether a current time is included within a range from the set schedule, according to a condition determined in operation S120.

For example, if it is determined that a component is to be modified two hours before a time input for the schedule in operation S120, a component displaying contact information on March 11 at 4:15 pm may be modified.

If a current time is included in a range from a time corresponding to the set schedule, the user device 200 may modify the component 210-2 displaying contact information to an object for displaying contact information of a place related to the schedule and for making a phone call to the displayed contact information in operation S720.

When the component 210-2 displaying contact information is selected according to a user input, the user device 200 may make a phone call to the displayed contact information.

Figure 9:
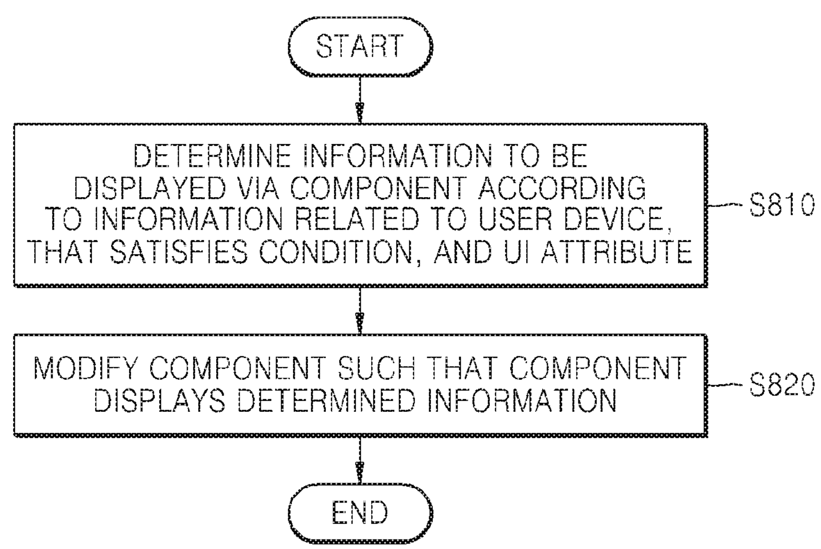
FIG. 9 is a flowchart of a process of modifying a component performed by a user device, according to an exemplary embodiment.

FIG. 9 is a flowchart of a process of modifying a component performed by a user device 200, according to an exemplary embodiment.

First, the user device 200 may determine information that is related to the user device 200 and satisfies a condition determined in operation S120 and information to be displayed via a component according to a UI attribute.

For example, if information related to a user device includes position information corresponding to the U.S.A., the user device may determine recommended application information related to U.S. bus lines as information to be displayed via a component whose UI attribute is an application execution icon for a bus line-related application.

According to another exemplary embodiment, the user device 200 may determine information to be displayed by considering not only information that is related to a user device and satisfies a determined condition and a UI attribute but by also considering other information whereby a user's context may be determined.

For example, if information related to a user device is about an earphone, a UI attribute of a component to be modified may be a service gadget for music replay. If the user device 200 determines that the user is exercising based on information obtained by using an acceleration sensor, the user device 200 may determine recommended music of a certain genre as information to be displayed via a gadget.

Next, the user device 200 may modify a component such that the component displays the determined information.

For example, the user device 200 may display information whereby a U.S. bus line-related application is recommended, on an execution icon of a bus line related application, displayed by using the display unit 240.

Figure 10:
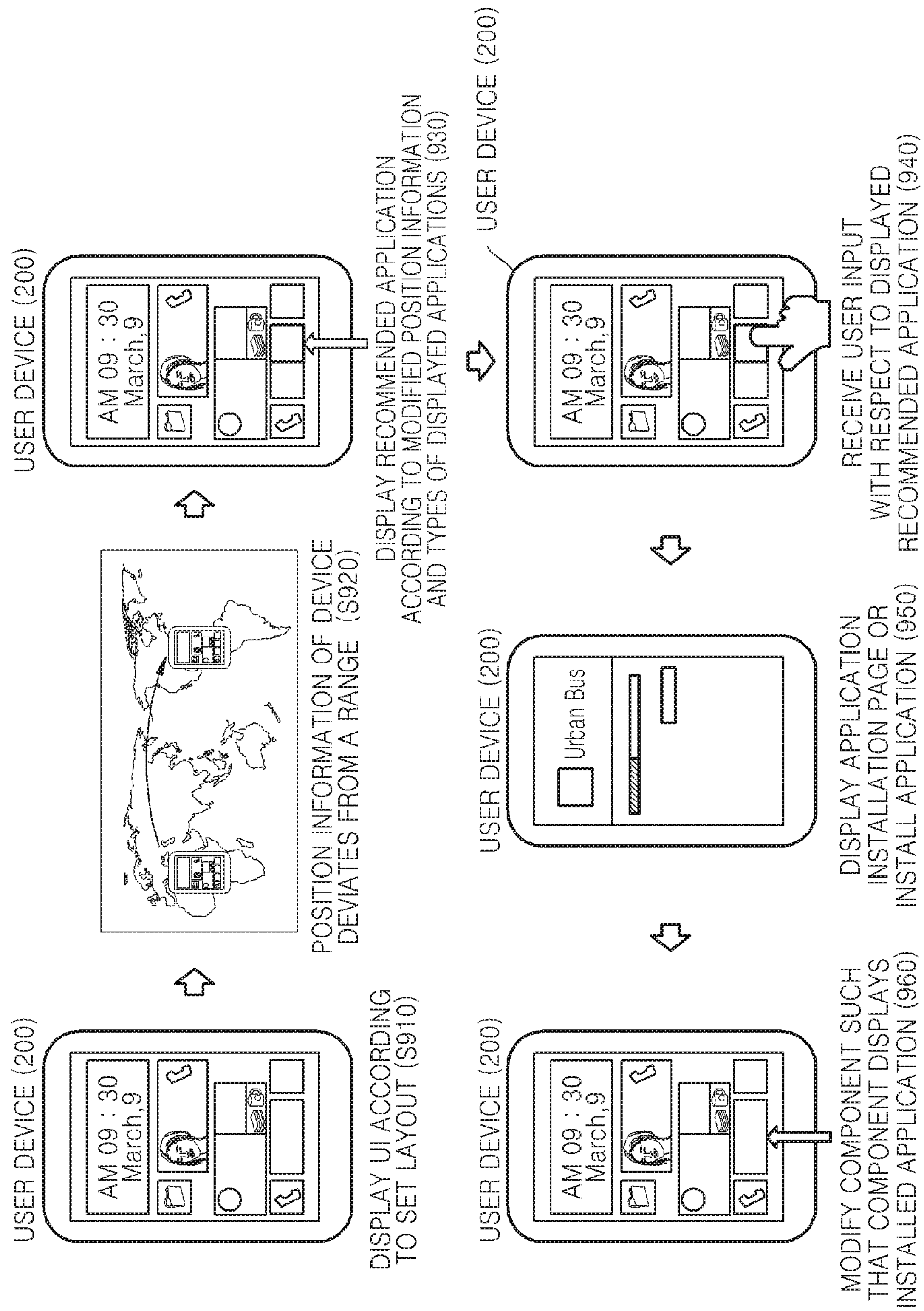
FIG. 10 illustrates a process of modifying and displaying a component, performed by a user device, based on position information of the user device, according to an exemplary embodiment.

FIG. 10 illustrates a process of modifying and displaying a component, performed by a user device 200, based on position information of the user device 200, according to an exemplary embodiment.

First, in operation S910, the user device 200 may display a UI according to a set layout.

Here, the set layout may be one that is set in operation S110. A layout may be set by arranging a component according to a user input or may be set as a default value when the user device 200 is manufactured. However, the exemplary embodiments are not limited thereto.

Then, if position information of the user device 200 deviates from a range in operation S920, the user device 200 may display recommended applications according to modified position information and according to displayed application types in operation S930.

Here, the range may be determined using various methods. For example, the user device 200 may store position information of the user device 200. The user device 200 may determine a range according to the stored position information. That is, if the user device 200 has moved only within an area within a month, the user device 200 may determine the area that the user device has moved within the month as a range.

Alternatively, the range may be determined according to a user input or may be set as a fixed value when the user device 200 is manufactured. However, the exemplary embodiments are not limited thereto, and the range may be variably set according to exemplary embodiments.

According to an exemplary embodiment, the user device 200 may display recommended application information related to modified position information if there is a component having a UI attribute that displays an application related to a region, in a layout.

Next, as the user device 200 receives a user input with respect to the displayed recommended applications in operation S940, the user device 200 may display an application installation page or install a recommended application in operation S950.

Here, a user input may be implemented in various forms such as a touch input, whereby a user contacts his or her body part to the displayed recommended application information, or a swipe input, whereby the displayed recommended application is dragged in a predetermined direction, but the exemplary embodiments are not limited thereto.

Next, the user device 200 may modify a component which is displaying 'Seoul Bus' so that it displays 'Urban Bus' which is the installed application, in operation S960.

Figure 11:
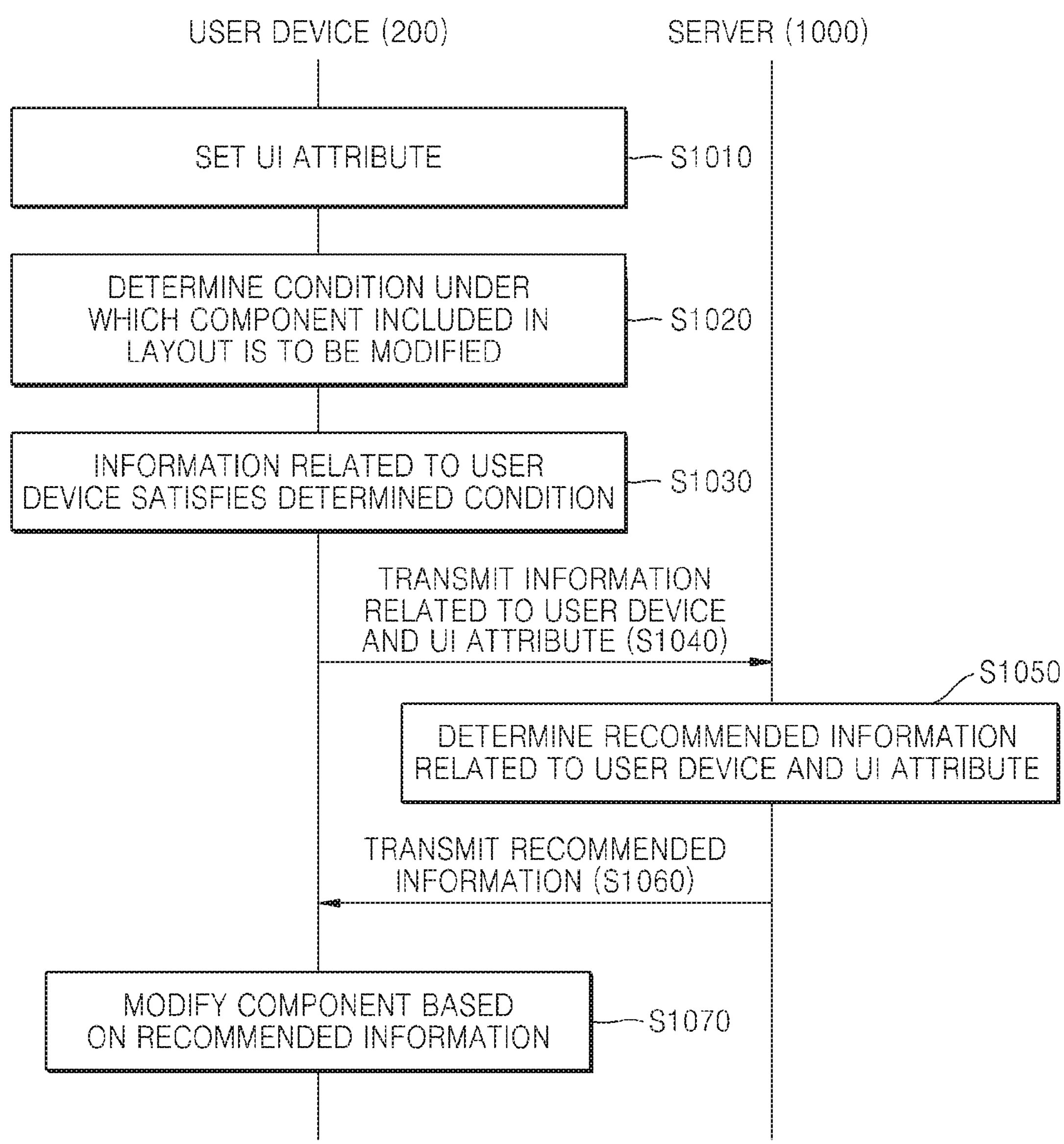
FIG. 11 illustrates a process of modifying a component included in a layout, performed by a user device, according to an exemplary embodiment.

FIG. 11 illustrates a process of modifying a component included in a layout, performed by a user device 200, according to an exemplary embodiment.

First, the user device 200 may set a UI attribute in operation S1010. The UI attribute may include a layout of a UI.

Next, the user device 200 may determine a condition under which a component included in a layout is to be modified in operation S1020, and may determine whether information related to the user device 200 satisfies the condition determined in operation S1020, in operation S1030.

If the information related to the user device 200 satisfies the condition determined in operation S1020, the user device 200 may transmit information related to the user device 200 and the UI attribute, to a server 1000, in operation S1040.

For example, the user device 200 may transmit a keyword that is input by a user to the user device 200 for information retrieval, and information about types of contents to be displayed via a UI, included in the UI attribute, to the server 1000.

Alternatively, the user device 200 may transmit, to the server 1000, information obtained via a SNS used by the user device 200 and the set UI attribute.

However, the exemplary embodiments are not limited thereto.

According to an exemplary embodiment, the server 1000 may store information related to the user device 200, received from the user device 200. For example, the server 1000 may receive information as shown in Table 1 below, from the user device 200, and store the same.

TABLE 1

| Kind of data | Contents | Type of data |
|---|---|---|
| Place information | current position information of device | Geocode |
| Time information | current time information | year, month, day, hour, minute |
| Personal information | user name | text |
| | contact information | telephone number (number), email address (text) |
| | personal relationship information | social graph |
| Schedule information | participant information | name (text), contact information (number and text) |
| | position information | Geocode and text |
| | time information | year, month, day, hour, minute |
| | keyword | Text |

In Table 1, the user device 200 may receive current position information in the form of Geocode and store the same. Geocode refers to a code whereby a geographical position is identified. The server 1000 may receive the Geocode corresponding to GPS coordinates received by using a GPS receiving unit and store the same. Alternatively, the server 1000 may receive the Geocode included in schedule information from the user device 200 and store the same. Current time information refers to a current time, and may not be received from the user device 200 but may be separately managed in the server 1000.

Personal information may include user names, contact information, and personal relationship information. The user names may include not only the name of a user that is using the user device 200 but also names of other users. For example, names of other users registered to an account of the user on a SNS service which the user device 200 is logged on to may be included in the user names. Alternatively, names of other users who are registered via a contact information management application of the user device 200 may be included in the user names. Contact information may include connection information for communicating with devices of other users, such as telephone numbers or email addresses. Personal relationship information may be information in the form of a social graph including a node and a tie. A node refers to a user included in a social network, and a tie refers to a relationship between nodes.

Table 1 is merely an example to help understand the exemplary embodiments, and the exemplary embodiments are not limited to the example shown in Table 1.

The server 1000 which has received the information related to the user device 200 and a UI attribute may determine recommended information based on the information related to the user device 200 and the UI attribute in operation S1050. Next, the server 1000 may transmit the determined recommended information to the user device 200 in operation S1060.

The user device 200 that has received recommended information may modify a component included in a layout such that the component displays the received recommended information in operation S1070.

Figure 12:
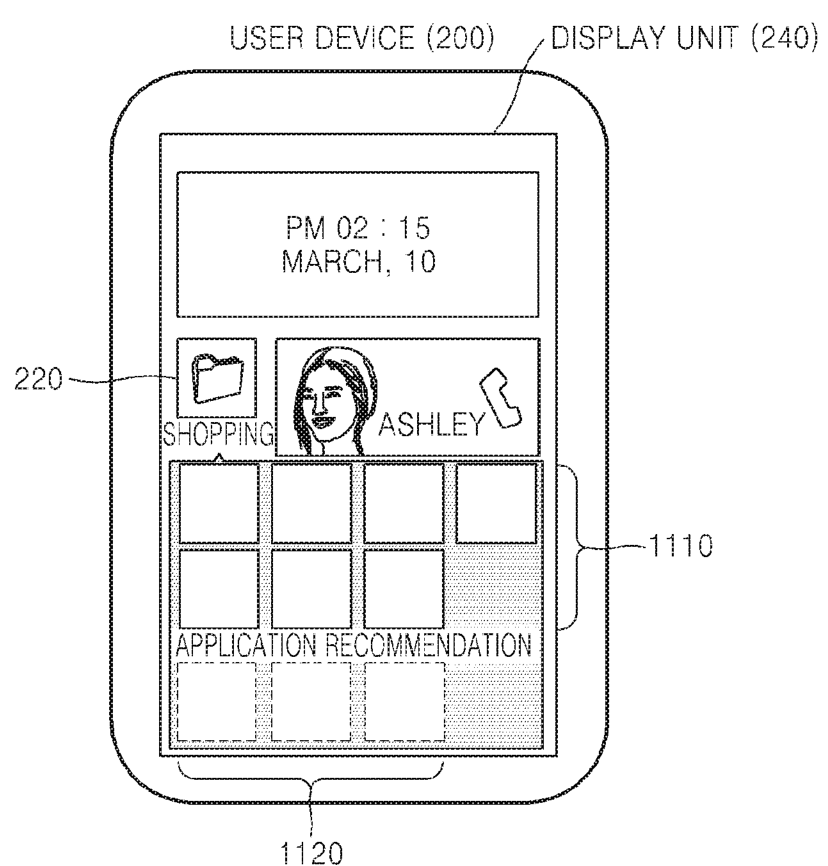
FIG. 12 illustrates an example of displaying recommendation information on a display unit, performed by a user device, according to an exemplary embodiment.

FIG. 12 illustrates an example of displaying recommendation information on a display unit 240, performed by a user device 200, according to an exemplary embodiment.

According to an exemplary embodiment, a component included in a layout may display a list regarding at least one application. The user device 200 may display a recommended application based on a type of an application included in the list, in operation S140, and information related to the user device 200, if the component included in the layout has a UI attribute displaying a list of the at least one application.

For example, if a component included in a layout is a folder 220 displaying an application list 1110 related to shopping, the user device 200 may display a list 1120 with respect to a recommended application for providing shopping information of areas nearby the user device 200 based on position information of the user device 200.

Figure 13:
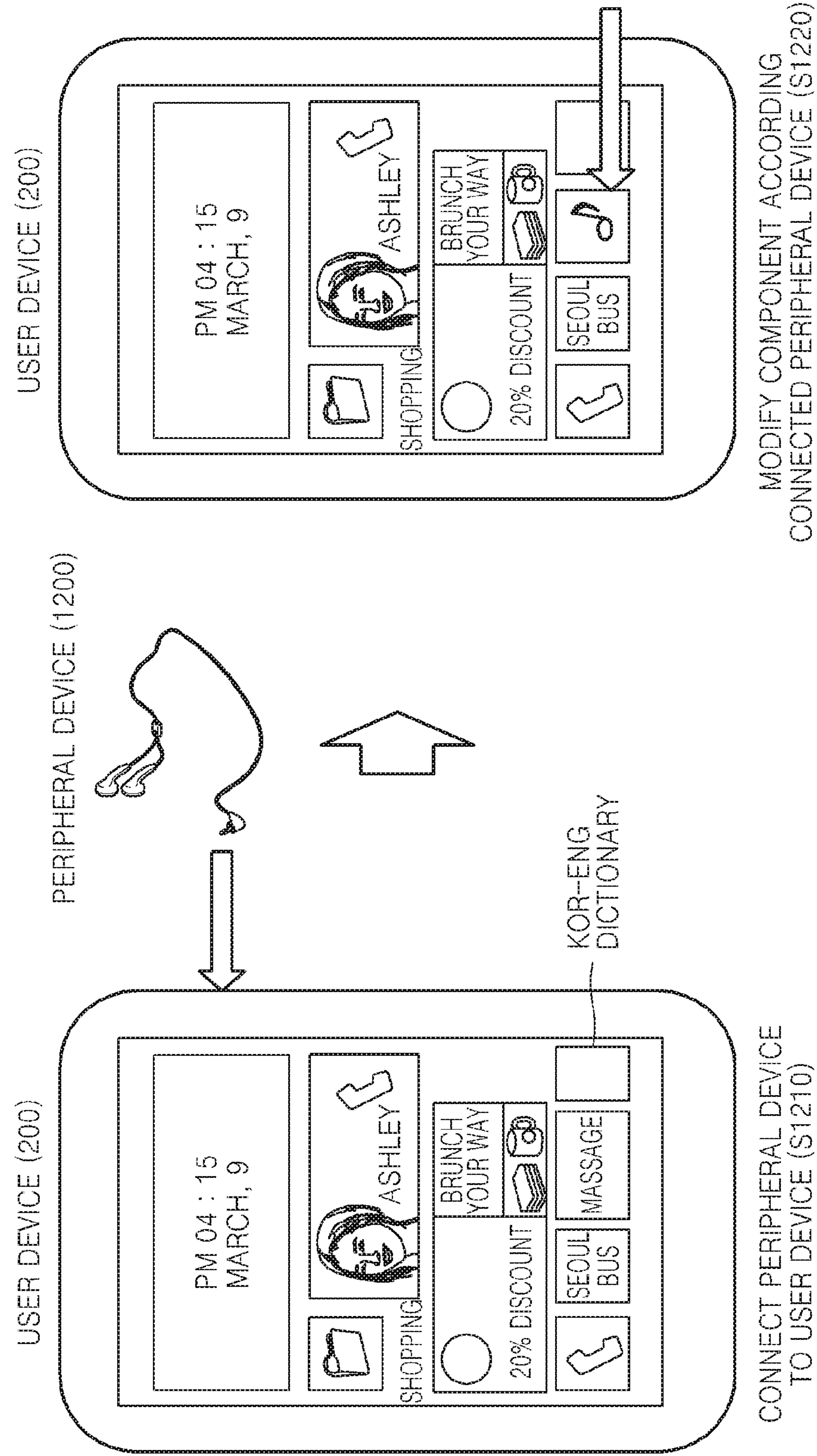
FIG. 13 illustrates a process of modifying a component included in a layout, performed by a user device, according to another exemplary embodiment.

FIG. 13 illustrates a process of modifying a component included in a layout, performed by a user device 200, according to another exemplary embodiment.

According to an exemplary embodiment, the condition determined in operation S120 may determine whether a peripheral device is connected to the user device 200 or not. A peripheral device refers to a device that may be connected to the user device 200 in a wired or wireless manner. A peripheral device may transmit or receive data, a control signal, or a state of the peripheral device or the user device 200 to or from the user device 200 or may operate as an input/output device of the user device 200. Examples of the peripheral device may include an earphone, a keyboard, a monitor, and a memory device.

If a peripheral device 1200 is connected to the user device 200 in operation S1210, the user device 200 may modify a component according to the connected peripheral device

1200 in operation S1220. For example, if an earphone is connected to the user device 200, the user device 200 may modify a component having a UI attribute related to content replay from among components included in a layout, to a component that displays a UI related to music replay.

Figure 14:
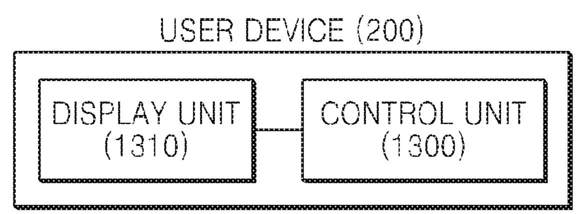
FIG. 14 is a schematic block diagram illustrating a structure of a user device according to an exemplary embodiment.

FIG. 14 is a schematic block diagram illustrating a structure of a user device 200 according to an exemplary embodiment.

The user device 200 may include a display unit 1310 that displays a UI including at least one object and a control unit (i.e., controller) 1300 that is capable of controlling each unit of the user device 200 and processes information.

The control unit 1300 according to an exemplary embodiment may select a first object related to an event, from among at least one object included in a UI, when a pre-set event is generated, and a second object related to a first operation that is executed when the first object is selected according to a user input regarding the user device 200, and may modify the selected first object to the second object.

In addition, an event according to another exemplary embodiment may be an event related to a pre-set user's schedule, and the first object and the second object may display information related to a user's schedule. The first operation and the second operation may be operations by which the user device 200 connects to an external device based on pre-set connection information according to a user input with respect to the user device 200. For example, if a user's schedule related to A is set, the first object for making a phone call at a time corresponding to a set schedule may be modified to a second object for making a phone call to a mobile phone owned by A.

In addition, according to another exemplary embodiment, a UI may be displayed on a home screen of the user device 200. Also, each of the first object and the second object may be formed of an application execution icon, an application execution screen, a widget or a combination of these. However, the exemplary embodiments are not limited thereto.

In addition, according to another exemplary embodiment, the control unit 1300 may obtain information related to an event, and may determine a second operation related to a first operation based on the information related to an event, and may determine a second object for executing the second operation.

Also, according to another exemplary embodiment, a first object may display information related to a first external device, and a first operation may be an operation of requesting a phone call to the first external device according to a user input. A second object may display information related to a second external device, and a second operation may be an operation of requesting a phone call to the second external device according to a user input.

Information related to the first external device may include at least one of a telephone number of the first external device, an image set with respect to the first external device, and identification information with respect to the first external device. Information related to the second external device may include at least one of a telephone number of the second external device, an image set with respect to the second external device, and identification information with respect to the second external device.

In addition, information related to an event may include information about a schedule of a user, set with respect to a user device, and the second external device may be an external device related to information about a user's schedule.

The control unit 1300 according to another exemplary embodiment may match at least one object included in a UI to an event related to a user's situation of the user device 200, select an object matching an event from among at least one object as an event is generated, and modify a display of the selected object by using the information obtained as an event is generated.

In addition, according to another exemplary embodiment, an event related to a user's situation may be an event related to information about a user's schedule. An object matching an event may be an object displaying information related to a user's schedule.

In addition, according to another exemplary embodiment, information related to a user's schedule displayed on an object may include connection information regarding an external device included in schedule information. The control unit 1300 may control the user device 200 such that the user device 200 connects to an external device according to a user input with respect to an object.

In addition, according to another exemplary embodiment, connection information may include at least one of a telephone number for making a phone call to an external device and identification information of an external device stored in the user device 200.

In addition, according to another exemplary embodiment, the control unit 1300 may obtain information related to a schedule by using an application installed in the user device 200.

Also, according to another exemplary embodiment, the control unit 1300 may modify a display of an object from an execution icon of a first application included in a UI to an execution icon of a second application determined based on information obtained as an event is generated. If the second application is not installed in the user device 200, the control unit 1300 may download the second application and install the same in the user device 200.

Also, according to an exemplary embodiment, an event related to a user's situation may be a modification of a geographical position of the user device 200. Information that is generated as an event is generated may include position information of the user device 200.

The control unit 1300 may set a UI attribute including a layout of a UI to be displayed on the user device 200, and may determine a condition under which a component included in the set layout is to be modified. If information related to the user device 200 satisfies the determined condition, the control unit 1300 may modify a component included in the set layout by considering the UI attribute.

According to an exemplary embodiment, a UI attribute may further include a type of content to be displayed via a UI. The type of content to be displayed via a UI may be a service gadget, a widget, an application execution icon, an application execution screen, and metadata of content, that is, information regarding which type of content is to be displayed via a UI, but is not limited thereto. For example, the type of content may include information for distinguishing between, for example, a service gadget that displays advertisement information and an execution icon for an application via which city bus information is provided, or the like. However, the exemplary embodiments are not limited thereto.

In addition, according to another exemplary embodiment, the control unit 1300 may set a UI attribute for each component included in a layout.

Also, according to another exemplary embodiment, the control unit 1300 may determine a condition under which a component is to be modified based on information input via an application installed in the user device 200.

If the application installed in the user device 200 is an application whereby a user's schedule may be input, the control unit 1300 may modify a component when a current time is included within a range from a time of a schedule set via the application.

In addition, according to another exemplary embodiment, the control unit 1300 may search for contact information related to a set schedule if a time set via the application installed in the user device 200 and the current time concur with each other. The control unit 1300 may control a component displaying contact information from among components included in a set layout such that the component displays contact information related to the set schedule.

According to another exemplary embodiment, the control unit 1300 may determine information to be displayed via a component in the determined layout according to information related to a user device and a UI attribute. The control unit 1300 may allow the display unit 1310 to display information determined via a component included in a layout.

Also, the control unit 1300 may determine recommended application information according to information related to a user device and a UI attribute. The control unit 1300 may determine the recommended application information as information to be displayed via a component included in a layout.

The control unit 1300 may install a recommended application in a user device according to a user input with respect to the recommended application displayed by using the display unit 1310. Alternatively, the control unit 1300 may display a page for installing a recommended application, by using the display unit 1310.

Also, if a component is a folder that displays a list of at least one application, the control unit 1300 may display a type of an application included in the list and a recommended application based on information related to the user device 200 by using the display unit 1310.

The display unit 1310, according to an exemplary embodiment, exemplary may display a UI according to a set layout.

Also, according to another exemplary embodiment, the user device 200 may further include an input/output unit 1410 that receives a user input. The control unit 1300 may make a phone call to the displayed contact information if a component modified based on input information of a user that is input via the input/output unit 1410 is selected.

Also, according to another exemplary embodiment, the user device 200 may further include a communication unit that transmits information related to a user device and a UI attribute to a server (not shown), and receives recommended information determined based on the information transmitted to the server. The communication unit may be formed of one of a mobile communication unit 1401, a sub-communication unit 1402, and a broadcasting receiving unit 1403 illustrated in FIG. 15 or a combination including at least two of these.

According to an exemplary embodiment, if information related to the user device 200 is position information of a user device, a condition under which a component is to be modified may be information regarding whether position information of the user device 200 deviates from a range.

According to another exemplary embodiment, if information related to the user device 200 is a text input to the user device 200 or a text received from an external device (not shown), a condition under which a component is to be modified may be information regarding whether information related to the user device 200 includes a keyword. An external device may be, for example, a server providing an SNS to which the user device 200 has connected.

Figure 15:
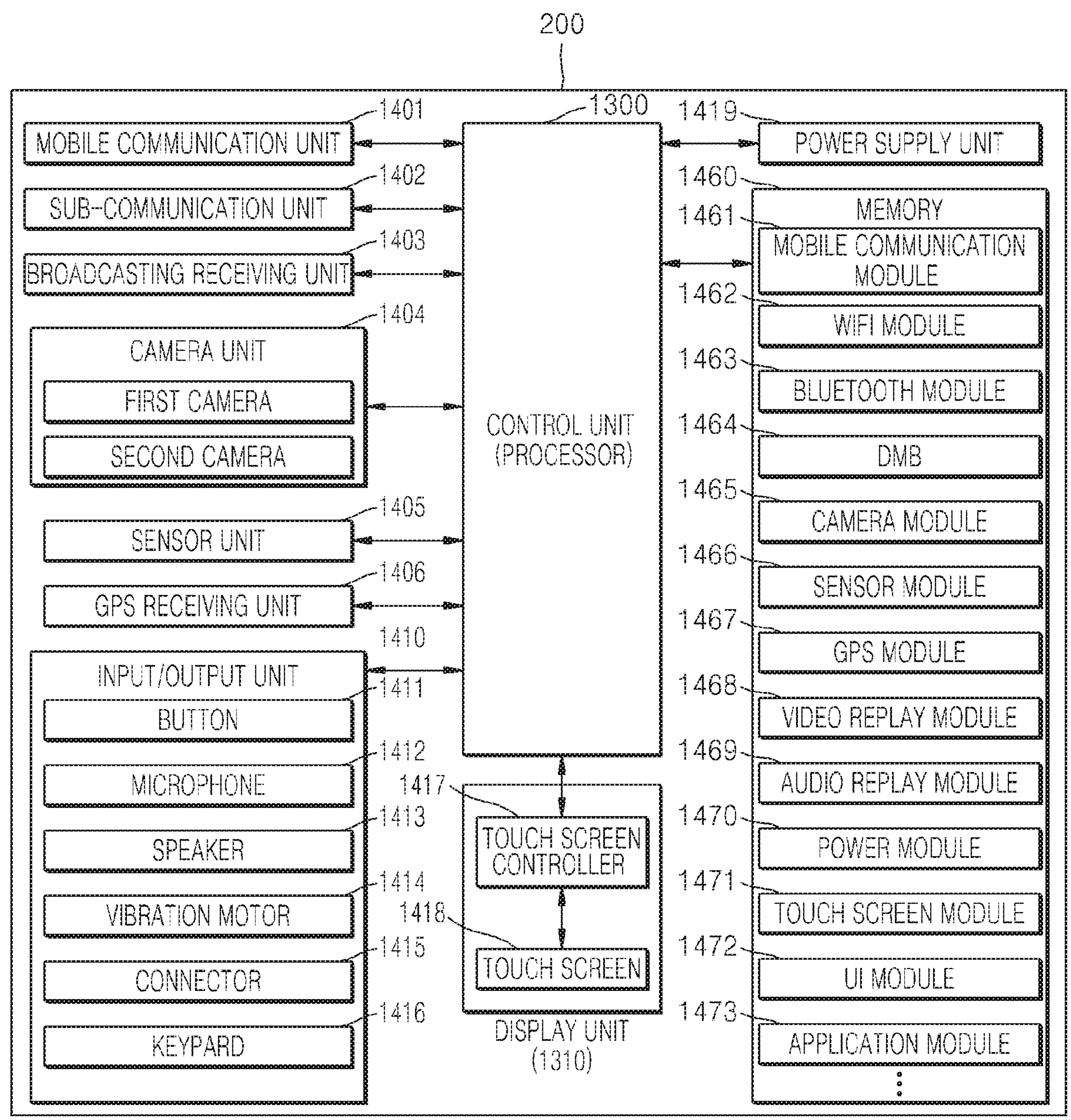
FIG. 15 is a structural diagram illustrating a user device according to an exemplary embodiment.

FIG. 15 is a structural diagram illustrating a user device 200 according to an exemplary embodiment.

A mobile communication unit 1410 may set a call with respect to a base station via a cellular network such as 3G or 4G or perform data communication. A sub-communication unit 1402 performs a function for short range communication, such as Bluetooth or Near Field Communication (NFC). A broadcasting unit 1403 receives a digital multimedia broadcasting (DMB) broadcast signal.

A camera unit 1404 includes a lens or an optical device for capturing an image or recording a video.

A sensor unit 1405 may include, for example, a gravity sensor sensing motion of a multi-vision controller, an illuminance sensor sensing luminance of light, a proximity sensor sensing proximity of a person, or a motion sensor sensing motion of a person. Other various sensors that are applicable to a device may be included in the sensor unit 1405.

A GPS receiving unit 1406 receives a GPS signal from an artificial satellite. Various services may be provided to a user by using the GPS signal.

The input/output unit 1410 provides an interface with respect to an external device or a person, and may include a button 1411, a microphone 1412, a speaker 1413, a vibration motor 1414, a connector 1415, and/or a keypad 1416.

A touch screen 1418 receives a touch input of a user. The touch screen controller 1417 transmits a touch input that is input via the touch screen 1418 to the control unit 1450. A power supply unit 1419 is connected to a battery or an external power source in order to supply required power to each unit of the user device 200.

The control unit 1300 processes information and controls the display unit 1310 according to the exemplary embodiments by executing programs stored in the memory 1460.

The programs stored in the memory 1460 may be classified as multiple modules according to their respective functions, such as a mobile communication module 1461, a Wi-Fi module 1462, a Bluetooth module 1463, a DMB module 1464, a camera module 1465, a sensor module 1466, a GPS module 1467, a video replay module 1468, an audio replay module 1469, a power module 1470, a touch screen module 1471, a UI module 1472, and an application module 1473.

In addition, the memory 1460 may store not only a program but also data including a UI attribute, schedule information or contact information.

Functions of the modules described above may be intuitively inferred from their names by one of ordinary skill in the art, and thus, here, only the application module 1473 will be described. The application module 1473 may receive a user input by using the input/output unit 1410 and may generate input information according to a user input. In addition, the application module 1473 may directly obtain information related to the user device 200 by using the camera unit 1404, the sensor unit 1405, or the GPS receiving unit 1460, or may obtain information related to the user device 200 from an external device (not shown) by using the mobile communication unit 1401 and the sub-communication unit 1402. In addition, the application module 1473 may determine a condition under which a component is to be modified, according to a control of the control unit 1300, or may receive information about a determined condition from an external server (not shown). Also, the application module 1473 may determine whether a condition is satisfied, and may provide information to be displayed, via a component.

Figure 16:
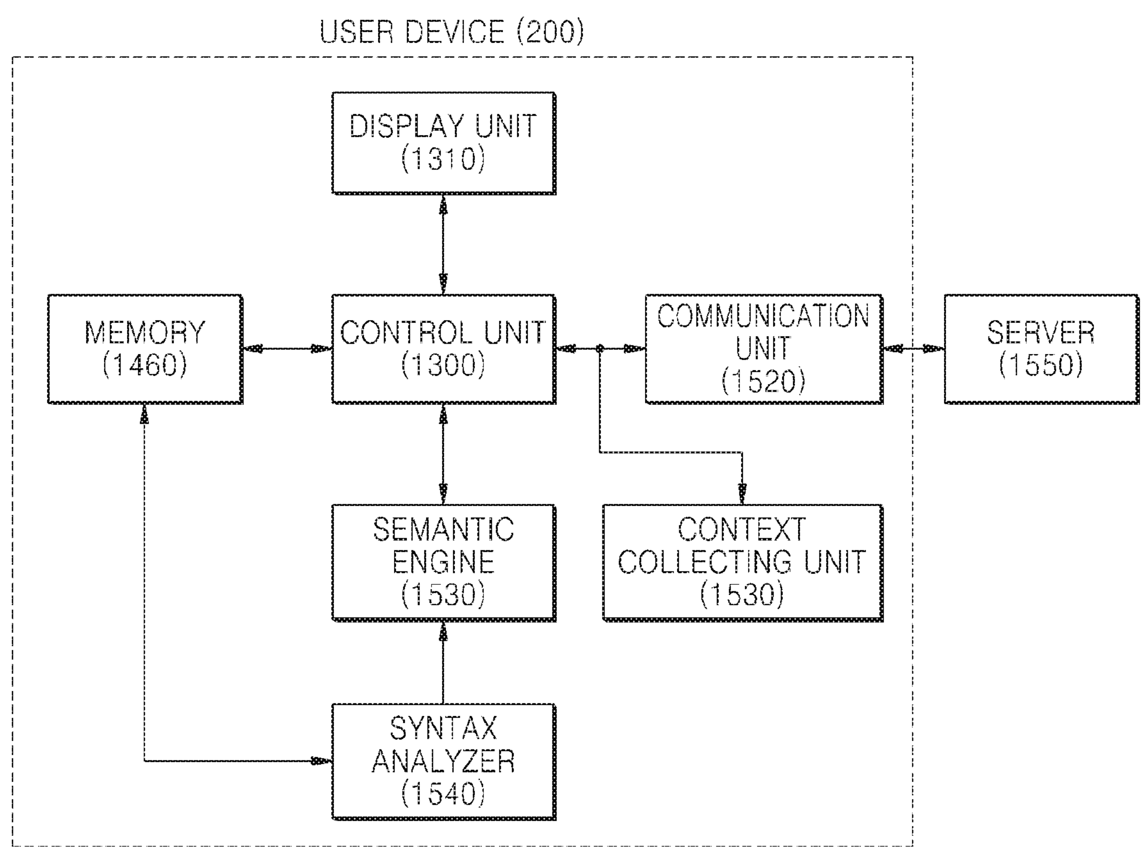
FIG. 16 is a structural diagram illustrating a user device according to another exemplary embodiment.

FIG. 16 is a structural diagram illustrating a user device 200 according to another exemplary embodiment.

The user device 200 may include the memory 1460 storing a program or data, a communication unit 1520 performing communication with a server 1550, a context collecting unit 1510 collecting context information, a semantic engine 1530 and a syntax analyzer (parser) 1540 for determining a condition under which a component is to be modified, the display unit 1310 for displaying a UI, and the control unit 1300 for controlling each of these units. Each of the units may include at least one of hardware, software, and a combination of hardware and software.

The control unit 1300 may set a UI attribute, and store the UI attribute in the memory 1460. For example, if a widget displaying contact information is arranged on a background screen to be displayed by using the display unit 1310, the control unit 1300 may store at least one attribute for displaying a position at which the widget is to be displayed and displaying contact information on the background screen, in the memory 1460.

The syntax analyzer (parser) 1540 may translate a keyword included in data stored in the memory 1460 or data received via the communication unit 1520 into machine code. For example, if a character string, received from the server 1550 that provides an SNS service which the user device 200 has logged on to, is 'see you at 2 pm at the office,' the syntax analyzer (parser) 1540 may translate '2 pm,' 'at the office,' and 'see you,' into corresponding machine codes. The syntax analyzer (parser) 1540 may translate not only a character string received from the server 1550 but also character strings included in data stored in the memory 1460 or a character string input to the user device 200 by a user.

The semantic engine 1530 may determine a condition under which a component is to be modified, based on a result of translation of a character string by the syntax analyzer (parser) 1540. For example, if a text message including a character string saying 'see you at 2 pm at the office,' is received from an external device, the semantic engine 1530 may store time information and position information respectively corresponding to '2 pm' and 'the office' as schedule information in the memory 1460, and set a component displaying contact information such that the component displays contact information of a user who has transmitted a text message at 2 pm.

Here, the user device 200 may determine whether to set a condition under which a component is to be modified. For example, when a text message is received, the user device 200 may receive user feedback regarding whether to update schedule information based on contents included in the text message and determine whether to set a component.

The context collecting unit 1510 may obtain context information. The control unit 1300 may modify a component displayed by using the display unit 1310 according to the context information obtained by using the context collecting unit 1510. For example, as position information obtained by the context collecting unit 1510 by using the GPS receiving unit 1406 is modified, the control unit 1300 may modify a component displaying bus line information such that the component displays bus line information corresponding to the modified position information.

The context collecting unit 1510 may obtain context information via the camera unit 1404, the sensor unit 1405, the GPS receiving unit 1406, and the input/output unit 1410. However, the exemplary embodiments are not limited thereto.

An exemplary embodiment may also be realized in a form of a recording medium including commands executable by a computer, such as a program module executed by a computer. A computer-readable recording medium may be an arbitrary available medium accessible by a computer, and may be any one of volatile, nonvolatile, separable, and non-separable media. Also, examples of the computer-readable recording medium may include a computer storage medium and a communication medium. Examples of the computer storage medium include volatile, nonvolatile, separable, and non-separable media realized by an arbitrary method or technology for storing information about a computer-readable command, a data structure, a program module, or other data. The communication medium may include a computer-readable command, a data structure, a program module, other data of a modulated data signal, or other transmission mechanisms, and may be an arbitrary information transmission medium.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A method of displaying a user interface UI on a display of a device, the method comprising:

displaying the UI according to a set layout, the UI displaying an application;

in response to detecting a position information of the device being out of a predetermined range, displaying a recommended application according to the position information and a type of the application displayed on the UI, the predetermined range being determined based on an area that the device has moved within a time period; and based on a user input selecting the recommended application, modifying an object on the UI to display the recommended application.

2. The method of claim 1, further comprising displaying an application installation page with respect to the recommended application.

3. The method of claim 1, further comprising installing the recommended application.

4. The method of claim 1, wherein the displaying the recommended application comprises displaying the recommended application according to application types displayed on the UI.

5. The method of claim 1, further comprising in response to detecting a predetermined time, displaying the recommended application.

6. A device for displaying a UI, the device comprising:

a display; and a controller configured to:

control the display to display the UI according to a set layout, the UI displaying an application;

in response to detecting a position information of the device being out of a predetermined range, display a recommended application according to the position information and a type of the application displayed on the UI, the predetermined range being determined based on an area that the device has moved within at time period; and based on a user input selecting the recommended application, modify an object on the UI to display the recommended application.

7. The device of claim 6, wherein the controller is further configured to display an application installation page with respect to the recommended application.

8. The device of claim 6, wherein the controller is further configured to install the recommended application.

9. The device of claim 6, wherein the controller is further configured to display the recommended application according to application types displayed on the UI.

10. The device of claim 6, wherein the controller is further configured to, in response to detecting a predetermined time, display the recommended application.

11. A non-transitory computer-readable recording medium having recorded thereon a program for executing the method of claim 1, by a computer.

* * * * *